United States Patent [19]
Pajor et al.

[11] Patent Number: 6,048,999
[45] Date of Patent: Apr. 11, 2000

[54] N-[N-(3,3-DIMETHYLBUTYL)-L-α-ASPARTYL]-L-PHENYLALANINE 1-METHYL ESTER SYNERGISTIC SWEETENER BLENDS

[75] Inventors: Laurie L. Pajor, Naperville; Kernon M. Gibes, Mount Prospect, both of Ill.

[73] Assignee: The NutraSweet Company, Del.

[21] Appl. No.: 09/236,353

[22] Filed: Jan. 25, 1999

[51] Int. Cl.[7] .................. C07C 229/28; C07D 279/04; C07D 275/06; C07D 315/00
[52] U.S. Cl. .................. 560/39; 544/53; 544/54; 548/211; 549/417
[58] Field of Search ................. 560/39; 544/53, 544/54; 548/211; 549/417

[56] References Cited

U.S. PATENT DOCUMENTS

| | | | |
|---|---|---|---|
| 3,780,189 | 12/1973 | Scott | 426/212 |
| 5,480,668 | 1/1996 | Nofre et al. | 426/548 |
| 5,510,508 | 4/1996 | Claude et al. | 560/41 |
| 5,728,862 | 3/1998 | Prakash | 560/40 |

OTHER PUBLICATIONS

Chung, Hai–Jung, 51:Food Sci & Tech. Abs of "Measurement of Synergistic Effects of Binary Sweetener Mixtures", J. Food Sci. & Nutrition, 2 (4) 291–295 (1997).
Fry, J., "Trends and Innovations in Low–Calorie Sweeteners", The World of Ingredients p. 16–18 (Mar./Apr. 1998).
Berenbaum, M.C., "What is Synergy", Pharmacological Reviews, vol. 1989, No. 41 pp. 93–141 (1990).
Print of http://www.foodexplorer.com/product/TECHTUT/F102740.HTM entitled "Sweetener Blends" dated Nov. 2, 1998.
Database CAPLUS on STN, Acc. No. 1998:621094, ISHII et al., 'Sweetner for improving taste.' WO 9839979 A1 (abstract), 1998.

*Primary Examiner*—Gary Geist
*Assistant Examiner*—Brian J. Davis
*Attorney, Agent, or Firm*—Fitzpatrick, Cella, Harper & Scinto

[57] ABSTRACT

This invention provides sweetener blends comprising N-[N-(3,3-dimethylbutyl)-L-α-aspartyl]-L-phenylalanine 1-methyl ester and another sweetener. The sweetener blends of this invention exhibit isobole synergy.

32 Claims, No Drawings

N-[N-(3,3-DIMETHYLBUTYL)-L-α-ASPARTYL]-L-PHENYLALANINE 1-METHYL ESTER SYNERGISTIC SWEETENER BLENDS

BACKGROUND OF THE INVENTION

1. Field of the Invention

The present invention relates to novel sweetener blends of N-[N-(3,3-dimethylbutyl)-L-α-aspartyl]-L-phenylalanine 1-methyl ester (also known as neotame) and another sweetener.

2. Related Background Art

N-[N-(3,3-dimethylbutyl)-L-α-aspartyl]-L-phenylalanine 1-methyl ester is a derivative of aspartame that has a sweetening potency that is about 40 times that of aspartame (and about 8,000 times that of sucrose). N-[N-(3,3-dimethylbutyl)-L-α-aspartyl]-L-phenylalanine 1-methyl ester may be prepared from aspartame as described in U.S. Pat. No. 5,480,668, U.S. Pat. No. 5,510,508, and U.S. Pat. No. 5,728,862, all of which are incorporated by reference herein.

These are four possible outcomes from sensory analysis of a blend of two physiologically active agents: suppression<no synergy<isobole synergy<additive synergy. It is known that certain sweetener agents exhibit additive synergy when combined with each other. For example, U.S. Pat. No. 3,780,189 describes synergistic sweetener blends of aspartame and saccharin. However, isobole synergy in sweetener blends has not been previously recognized. Moreover, there is no disclosure or suggestion that N-[N-(3,3-dimethylbutyl)-L-α-aspartyl]-L-phenylalanine 1-methyl ester sweetener blends could be isobole synergistic.

The known additive synergy exhibited by aspartame sweetener blends is not a reasonable prediction of even additive synergy of neotame sweetener blends, let alone that such blends could be isobole synergistic. Structurally, N-[N-(3,3-dimethylbutyl)-L-α-aspartyl]-L-phenylalanine 1-methyl ester and aspartame differ in that, in N-[N-(3,3-dimethylbutyl)-L-α-aspartyl]-L-phenylalanine 1-methyl ester, a bulky neohexyl substituent is present on the amine nitrogen.

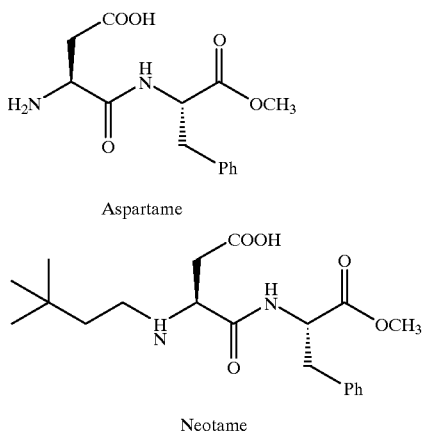

Aspartame

Neotame

This structural difference results in dramatic differences in the physical and chemical properties of these compounds. For example, the melting point of N[N-(3,3-dimethylbutyl)-L-α-aspartyl]-L-phenylalanine 1-methyl ester is about 82.2° C., while that of aspartame is 248° C. In addition, N-[N-(3,3-dimethylbutyl)-L-α-aspartyl]-L-phenylalanine 1-methyl ester has much higher solubility in organic solvents than aspartame, and a much lower solubility in water. It is also known that N-[N-(3,3-dimethylbutyl)-L-α-aspartyl]-L-phenylalanine 1-methyl ester has a higher stability than aspartame under some pH conditions, as described in U.S. Pat. No. 5,480,688. The pronounced difference in sweetness potency between the two compounds is further evidence of their chemical dissimilarity.

Moreover, it is also known that a primary amino group such as the one on aspartame (pKa 7.7) generally has a different pKa than those from a secondary amino group such as the one on N-[N-(3,3-dimethylbutyl)-L-α-aspartyl]-L-phenylalanine 1-methyl ester (pKa 8.1). Moreover, the pKa's of an amino acid are known to have a profound impact on food applications (Labuza, T. P. and Basisier, M. W., 1992, "Physical Chemistry of Foods", H. G. Schwartzber and R. W. Hartel (Eds.), Marcel Dekker, Inc., New York). It is also well known that a secondary amine group can not form Schiff base type compounds with carbonyl compounds while a primary amine may. Furthermore, N-[N-(3,3-dimethylbutyl)-L-α-aspartyl]-L-phenylalanine 1-methyl ester exhibits physiologically different behavior than aspartame as exemplified by the dramatic difference in sweetness. These differences are clearly indicative that the characteristics and properties of one can not be said to suggest those of the other.

N-[N-(3,3-dimethylbutyl)-L-α-aspartyl]-L-phenylalanine 1-methyl ester may be used for sweetening a variety of products, including drinks, foods, confectionery, pastries, chewing gums, personal care, hygiene products and toiletries, as well as cosmetic, pharmaceutical and veterinary products. Its superior sweetening potency makes N-[N-(3,3-dimethylbutyl)-L-α-aspartyl]-L-phenylalanine 1-methyl ester an attractive alternative to aspartame because it permits the use of N-[N-(3,3-dimethylbutyl)-L-α-aspartyl]-L-phenylalanine 1-methyl ester in substantially smaller quantities than is required for aspartame to achieve an equivalent sweetening effect.

Synergy between two sweeteners can be defined as occurring when the sweetness intensity of a mixture of the sweeteners is greater than what would have been expected from their individual concentration response relationships. One explanation for the potential existence of synergy between sweeteners is the possibility of multiple sweetness receptor sites. Synergy is important in the use of sweeteners in food products because it offers both cost savings and flavor improvement possibilities. For example, a synergistic combination of aspartame and acesulfame-K is widely used to sweeten beverages in Europe. Fry, J., "Trends and Innovations in Low-Calorie Sweeteners", *The World of Ingredients* p. 16–18 (March/April 1998). Synergistic combinations are advantageous because they permit the use of smaller quantities of each of the individual agents than would be required otherwise. Thus, the use of synergistic combinations may offer a more cost effective way to achieve a desired physiological effect.

It would be highly desirable to provide synergistic blends of N-[N-(3,3-dimethylbutyl)-L-α-aspartyl]-L-phenylalanine 1-methyl ester with other sweeteners.

SUMMARY OF THE INVENTION

This invention is related to sweetener blends comprising N-[N-(3,3-dimethylbutyl)-L-α-aspartyl]-L-phenylalanine 1-methyl ester and another sweetener. The sweetener blends of this invention are isobole synergistic.

DETAILED DESCRIPTION OF THE INVENTION

It has been discovered that synergy between two or more sweeteners may be classified as isobole synergy. A combination of sweeteners is said to display isobole synergy when the sweetness produced by the combination exceeds that which would be expected if the sweeteners did not interact. In comparison, a combination of sweeteners is said to display additive synergy when the sweetness produced by the combination exceeds that which would be expected if the individual sweetness of the sweeteners were summed.

In particular, it has been discovered that blends of N[N-(3,3-dimethylbutyl)-L-α-aspartyl]-L-phenylalanine 1-methyl ester with various other sweeteners exhibit at least isobole synergy. Some blends exhibit additive synergy as well. Sweeteners which may be combined with N-[N-(3,3-dimethylbutyl)-L-α-aspartyl]-L-phenylalanine 1-methyl ester in the synergistic blends of the present invention include, for example, saccharin, acesulfameK, aspartame, sucrose and mixtures thereof. Of course the blend may comprise more than two sweeteners if desired. Isobole synergy may also be achieved with other blends of high intensity and natural sweeteners such as sucralose, alitame, cyclamates, stevia derivatives, thaumatin, high fructose corn syrup, crystalline fructose, high conversion corn syrup, crystalline fructose, high conversion corn syrup, glucose (dextrose), polyol sugar alcohols, invert sugar and mixtures thereof.

As noted previously, the interactions between physiological active agents may result in one of four possibilities: suppression; no synergy; isobole synergy or additive synergy. Suppression occurs if the measured intensity of a mixture of agents is less intense than what would have been expected if they did not interact. No synergy is indicated when the measured intensity of a mixture equals the predicted intensity from a non-interactive linear curve. Isobole synergy describes the type of synergy that occurs when the measured intensity of a mixture is more intense than what would be expected if the mixture components did not interact together. Additive synergy occurs when the measured intensity of a mixture is more intense than what would be expected if the measured intensities of the individual components of the mixture were summed.

There are several methods reported in the pharmaceutical industry for analyzing interactions between physiologically active agents. One of these methods is known as the isobole method. This method involves constructing iso-effective curves (i.e., isoboles) in which a combination of agents $(d_a,d_b)$ is represented by a point on a graph the axes of which are the dose-axes of the individual agents (a and b). If the agents do not interact, the curve joining the point representing the combination $(d_a,d_b)$ to those on the dose-axes representing doses iso-effective with the combination ($D_a$ along the "a" axis and $D_b$ along the "b" axis) will be a straight line.

The equation for the zero interaction line for two agents is $$\frac{d_a}{D_a} + \frac{d_b}{D_b} = 1 \tag{1}$$

where $D_a$ is the amount of agent "a" needed to produce a given physiological effect; $D_b$ is the amount of agent "b" needed to produce a physiological effect equal to the effect produced by $D_a$; $d_a$ and $d_b$ represent the respective amounts of agents "a" and "b" that must be used in the combination $(d_a,d_b)$ to produce an effect equal to the effect produced by $D_a$ (or $D_b$). Thus, combination $(d_a,d_b)$, $D_a$ and $D_b$ are iso-effective with respect to each other.

When agents in combination are more effective than expected based upon their dose-response curves (i.e, synergistic), smaller amounts are needed to produce the desired effect. Thus, $d_a$ and/or $d_b$ are reduced, while $D_a$ and $D_b$ are unchanged. Consequently, the equation for a synergistic combination is $$\frac{d_a}{D_a} + \frac{d_b}{D_b} < 1 \tag{2}$$

Conversely, the equation for an antagonistic combination is $$\frac{d_a}{D_a} + \frac{d_b}{D_b} > 1 \tag{3}$$

Using equation 1, it is possible to calculate the effect that would be expected for a non-interactive combination of agents. This is termed the "isobole expected effect". If the "actual effect" of the combination exceeds its "isobole expected effect", the combination is synergistic. Conversely, if the "isobole expected effect" exceeds the "actual effect", the combination is antagonistic.

Heretofore the application of isobole synergy to sweetener blends was not recognized or appreciated. In the present invention, it was discovered that the isobole methodology used by the pharmaceutical industry could be applied to the food and/or sweetener industry. Instead of "agents", "physiological effect", "iso-effective", and "doses", the terms sweeteners, sweet response, iso-sweet, and concentrations are relevant to the sweetener industry.

The isobole methodology provides a means to detect synergy of sweeteners at or below the simple additive level of current industry practice. Thus, synergy can now be determined for instances that would have been considered non-synergistic or antagonistic (referred to as "mixture suppression" in the sweetener industry). The steps of t he isobole method as applied to sweet taste synergy are described below.

The first step in assessing sweetness synergy is to establish the concentration response relationships for each of the individual sweeteners. The concentration response relationship can be conveniently expressed as a plot of sweetener response vs. concentration. This involves generating sensory data on the sweetness in tensity of the sweetener at several concentrations, and then modeling the results. Several mathematic al models are available for fitting sweetness intensity data, but will be referred to generically as a "function" below.

The equation for the concentration response curve of sweetener "a" is $$R=f_a(d_a) \tag{4}$$

where $d_a$ is now the concentration of sweetener "a" that produces a sweetness taste intensity of "R", and "$f_a$" represents the functional form of the "a" curve.

Similarly, the equation for the concentration response curve of sweetener "b" is $$R=f_b(d_b) \tag{5}$$

where $d_b$ is now the concentration of sweetener "b" that produces a sweetness taste intensity of "R", and "$f_b$" represents the functional form of the "b" curve.

The second step entails using equation 1 to calculate the "expected isobole sweetness", $R_{ab}$, of a given blend $(d_a,d_b)$.

The concentrations of individual sweeteners that are iso-sweet to a given sweetness intensity, $R_{ab}$, are the inverses of the individual functions. From equation 4, the equation for the inverse of the sweetness taste response of sweetener "a" is $$D_a = f_a^{-1}(R_{ab}) \qquad (6)$$

where $D_a$ is now the specific concentration of "a" that is iso-sweet to sweetness intensity $R_{ab}$. Similarly, from equation 5, the sweetener "b" inverse is $$D_b = f_b^{-1}(R_{ab}) \qquad (7)$$

After substituting equations 6 and 7 for the iso-sweet concentrations, equation 1 can be written as $$\left(\frac{d_a}{f_a^{-1}(R_{ab})}\right) + \left(\frac{d_b}{f_b^{-1}(R_{ab})}\right) = 1 \qquad (8)$$

The expected isobole sweetness intensity $R_{ab}$ for blend $(d_a, d_b)$ can then be obtained from equation 8. Depending upon the forms of the inverse functions, $R_{ab}$ may be solved for algebraically. For example, if $f_a$ and $f_b$ are both Beidler equations, the expression for $R_{ab}$ is the Beidler mixture equation (Beidler, L. M., 1962, "Taste receptor stimulation," Progress in Biophysics 12, 109-151). In those instances where an algebraic solution is not available, $R_{ab}$ can be obtained by numerical methods widely available in computer software programs. The "expected additive sweetness" $R_{a+b}$ of a blend of sweeteners $(d_a, d_b)$ is directly obtained from the individual concentration response functions by adding them together. Thus, the equation for the expected additive sweetness is $$R_{a+b} = f_a(d_a) + f_b(d_b) \qquad (9)$$

The final step in assessing synergy is to compare the observed sweetness intensity of a blend with its expected sweetness intensity, $R_{ab}$ or $R_{a+b}$. Data from sensory panels can be compared to the expected results, and whether the difference is statistically significant can be checked using conventional statistical analysis of variance methods, for example, contrast t-tests.

The interaction between two or more physiologically active agents may vary considerably depending upon the weight ratio of each agent. Thus, a given blend may be synergistic at one weight ratio and non-interactive (or even antagonistic) at another weight ratio. The sweeteners in the blends of this invention are present in an amount effective to provide an isobole synergistic effect.

The N-[N-(3,3-dimethylbutyl)-L-α-aspartyl]-L-phenylalanine 1-methyl ester used herein may take any form. For example, it may be in the form of a salt or complex such as disclosed in U.S. patent application Ser. No. 09/146,963, U.S. patent application Ser. No. 09/146,964, U.S. patent application Ser. No. 09/148,134 and U.S. patent application Ser. No. 09/146,965, all filed Sep. 4, 1998, and all of which are incorporated by reference herein. Yet another example includes N-[N(3,3-dimethylbutyl)-L-α-aspartyl]-L-phenylalanine 1-methyl ester cyclodextrin complexes such as described in U.S. Provisional Patent Application No. 60/100,867, filed Sep. 17, 1998, which is incorporated by reference herein.

The ratio of N-[N-(3,3-dimethylbutyl)-L-α-aspartyl]-L-phenylalanine 1-methyl ester to sweetener that may be used in the blends of this invention depend upon the particular sweetener chosen. For example, the weight ratio of N-[N-(3,3-dimethylbutyl)-L-α-aspartyl]-L-phenylalanine 1-methyl ester to saccharin may vary from about 1:1.18 to about 1:517. Preferably, the weight ratio is between about 1:7.5 to about 1:121.

The weight ratio of N-[N-(3,3-dimethylbutyl)-L-α-aspartyl]-L-phenylalanine 1-methyl ester to acesulfameK may vary from about 1:2.48 to about 1:1497. Preferably, the weight ratio is between about 1:14 to about 1:294.

The weight ratio of N-[N-(3,3-dimethylbutyl)-L-α-aspartyl]-L-phenylalanine 1-methyl ester to aspartame may vary from about 1:3.97 to about 1:564. Preferably, the weight ratio is between about 1:13 to about 1:238.

The weight ratio of N-[N-(3,3-dimethylbutyl)-L-α-aspartyl]-L-phenylalanine 1-methyl ester to sucrose may vary from about 1:746 to about 1:94,115. Preferably, the weight ratio is between about 1:1786 to about 1:33,333.

The sweetener blend of this invention may be used in any food or beverage composition. Such compositions include baked goods, dairy products, carbonated and non-carbonated beverages, confections, gums and the like. The blend may be packaged in individual serving sachets or such larger packaging as desired.

One example of a particularly preferred blend is sucrose and N-[N-(3,3-dimethylbutyl)-L-α-aspartyl]-L-phenylalanine 1-methyl ester. Such a blend may be advantageously employed as a synergistic sucrose extender which could be particularly beneficial in economies in which sucrose demands a premium price. This invention is also directed to an aqueous solution comprising the sweetener blend described above. The aqueous solution of this invention includes beverages, e.g., carbonated and non-carbonated soft drinks, and liquid table top sweeteners. The aqueous solutions of this invention contain the sweetener blend in a concentration range effective to provide isobole synergistic sweetening to the solution. The concentrations of N-[N-(3,3-dimethylbutyl)-L-α-aspartyl]-L-phenylalanine 1-methyl ester and the other sweetener will vary depending on the application and the blend weight ratio. Once the blend ratio of the sweetener blend has been determined, the concentration of the sweetener blend used in an aqueous solution that provides an isobole synergistic effect can be readily determined without undue experimentation. One skilled in the art can use the invention described herein to formulate various products having isobole synergistic sweetness.

Examples of the advantages of this invention may include: real cost savings realized from overall reduction in total sweetener use, the ability to sweeten products to a higher sweetness level than would be possible with certain single sweeteners alone, due to presence of bitter or other side tastes, and an overall improvement in sweet taste character and timeintensity or temporal profile.

The examples which follow are intended as an illustration of certain preferred embodiments of the invention, and no limitation of the invention is implied.

EXAMPLE 1

Preparation of N-[N-(3,3-dimethylbutyl)-L-α-aspartyl]-L-phenylalanine 1-methyl ester/saccharin Synergistic Blends (1:7.5 weight ratio)

Five different aqueous solution of neotame/saccharin blends were prepared. Each solution had a blend weight ratio of 1:7.5, but different sweetener concentration levels as noted in Table 1.

The sweetness intensities of each of the five solutions were measured by a trained taste panel of 10–15 individuals using a 15 point intensity scale measured in sucrose equivalency (% SE), i.e., 2SE=2% sucrose, 5SE=5% sucrose, 7.5SE=7.5% sucrose, 10SE=10% sucrose and 12SE=12% sucrose. The results of these measurements are set forth in Table 1.

EXAMPLE 2

Preparation of N-[N-(3,3-dimethylbutyl)-L-α-aspartyl]-L-phenylalanine 1-methyl ester/saccharin Synergistic Blends (1:29 weight ratio)

Five blends of N-[N-(3,3-dimethylbutyl)-L-α-aspartyl]-L-phenylalanine 1-methyl ester and saccharin were prepared as described in Example 1, except that in each of these blends the ratio of N-[N-(3,3-dimethylbutyl)-L-α-aspartyl]-L-phenylalanine 1-methyl ester to saccharin was 1:29.

The sweetness intensities of each of the five solutions were measured as previously described and the results of these measurements are set forth in Table 1.

EXAMPLE 3

Preparation of N-[N-(3,3-dimethylbutyl)-L-α-aspartyl]-L-phenylalanine 1-methyl ester/saccharin Synergistic Blends (1:121 weight ratio)

Five blends of N-[N-(3,3-dimethylbutyl)-L-aaspartyl]-L-phenylalanine 1-methyl ester and saccharin were prepared as described in Example 1, except that in each of these blends the ratio of N-[N-(3,3-dimethylbutyl)-L-α-aspartyl]-L-phenylalanine 1-methyl ester to saccharin was 1:121.

The sweetness intensities of each of the five solutions were measured as previously described and the results of these measurements are set forth in Table 1. Table 1 also shows the predicted isobole expected sweetness and predicted additive expected sweetness values for each of the blends.

TABLE 1

Synergy of N-[N-(3,3-dimethylbutyl)-L-α-aspartyl]-L-phenylalanine 1-methyl ester/saccharin Blends

| Blend Ratio Wt:Wt | Neotame (ppm) | Saccharin (ppm) | Observed Sweetness Intensity | Predicted Isobole Expected Sweetness | Predicted Additive Expected Sweetness |
|---|---|---|---|---|---|
| 1:7.5 | 1.15 | 8.60 | 1.90 | 2.0 | 2 |
| 1:7.5 | 2.50 | 18.64 | 4.95 | 3.85** | 4** |
| 1:7.5 | 4.10 | 30.65 | 6.84 | 5.46** | 6** |
| 1:7.5 | 6.05 | 45.20 | 8.14 | 6.88** | 8 |
| 1:7.5 | 8.44 | 63.06 | 9.69 | 8.12** | 10 |
| 1:29 | 0.73 | 21.16 | 1.78 | 1.98 | 2 |
| 1:29 | 1.48 | 43.01 | 4.65 | 3.67** | 4 |
| 1:29 | 2.33 | 67.55 | 6.20 | 5.13** | 6 |
| 1:29 | 3.31 | 96.04 | 7.48 | 6.41** | 8 |
| 1:29 | 4.48 | 130.09 | 8.78 | 7.54** | 10 |
| 1:121 | 0.29 | 34.99 | 2.68 | 1.96* | 2* |
| 1:121 | 0.59 | 71.06 | 4.89 | 3.73** | 4** |
| 1:121 | 0.95 | 114.16 | 6.71 | 5.34** | 6* |
| 1:121 | 1.40 | 168.39 | 8.24 | 6.78** | 8 |
| 1:121 | 1.99 | 239.31 | 8.93 | 8.05** | 10 |

Statistical Significance:
Statistical results are from t - tests comparing the observed sweeteners intensity with the expected intensity
*10% significance level
**5% significance level A comparison of the observed sweetness intensity values to the isobole expected sweetness values in Table 1 shows that the blends of N-[N-(3,3-dimethylbutyl)-L-α-aspartyl]-L-phenylalanine 1-methyl ester with saccharin displayed isobole and additive synergy at blend ratios ranging from 1:7.5 to 1:121.

EXAMPLE 4

Preparation of N-[N-(3,3-dimethylbutyl)-L-α-aspartyl]-L-phenylalanine 1-methyl ester/acesulfame-K Synergistic Blends (1:14 weight ratio)

Five different aqueous solutions of neotame/acesulfame-K blends were prepared. Each solution had a blend weight ratio of 1:14, but different sweetener concentration levels as noted in Table 2.

The sweetness intensities of each of the five solutions were measured as previously described and the results of these measurements are set forth in Table 2.

EXAMPLE 5

Preparation of N-[N-(3,3-dimethylbutyl)-L-α-aspartyl]-L-phenylalanine 1-methyl ester/acesulfame-K Synergistic Blends (1:64 weight ratio)

Five blends of N-[N-(3,3-dimethylbutyl)-L-α-aspartyl]-L-phenylalanine 1-methyl ester and acesulfame-K were prepared as described in Example 4, except that in each of these blends the ratio of N-[N(3,3-dimethylbutyl)-L-α-aspartyl]-L-phenylalanine 1-methyl ester to acesulfame-K was 1:64.

The sweetness intensities of each of the five solutions were measured as previously described and the results of these measurements are set forth in Table 2.

EXAMPLE 6

Preparation of N-[N-(3,3-dimethylbutyl)-L-α-aspartyl]-L-phenylalanine 1-methyl ester/acesulfame-K Synergistic Blends (1:294 weight ratio)

Five blends of N-[N-(3,3-dimethylbutyl)-L-α-aspartyl]-L-phenylalanine 1-methyl ester and acesulfame-K were prepared as described in Example 4, except that in each of these blends the ratio of N-[N-(3,3-dimethylbutyl)-L-α-aspartyl]-L-phenylalanine 1-methyl ester to acesulfame-K was 1:294.

The sweetness intensities of each of the five solutions were measured and the results of these measurements are set forth in Table 2. Table 2 also shows the predicted isobole expected sweetness and predicted additive expected sweetness values for each of the blends.

TABLE 2

Synergy of N-[N-(3,3-dimethylbutyl)-L-α-aspartyl]-L-phenylalanine 1-methyl ester/acesulfame-K Blends

| Blend Ratio Wt:Wt | Neotame (ppm) | Ace-K (ppm) | Observed Sweetness Intensity | Predicted Isobole Expected Sweetness | Predicted Additive Expected Sweetness |
|---|---|---|---|---|---|
| 1:14 | 1.08 | 15.29 | 1.79 | 1.91 | 2 |
| 1:14 | 2.39 | 33.91 | 4.27 | 3.65** | 4 |
| 1:14 | 4.02 | 56.90 | 6.10 | 5.24** | 6 |
| 1:14 | 6.05 | 85.71 | 7.92 | 6.67** | 8 |
| 1:14 | 8.65 | 122.49 | 9.18 | 7.96** | 10 |
| 1:64 | 0.63 | 40.38 | 1.52 | 1.86 | 2 |
| 1:64 | 1.37 | 87.71 | 3.60 | 3.49 | 4 |
| 1:64 | 2.25 | 143.93 | 5.73 | 4.92** | 6 |
| 1:64 | 3.31 | 211.76 | 7.45 | 6.19** | 8 |
| 1:64 | 4.61 | 295.17 | 9.10 | 7.31** | 10 |
| 1:294 | 0.23 | 67.65 | 2.34 | 1.92 | 2 |
| 1:294 | 0.52 | 154.20 | 3.97 | 3.67 | 4 |

TABLE 2-continued

Synergy of N-[N-(3,3-dimethylbutyl)-L-α-aspartyl]-
L-phenylalanine 1-methyl ester/acesulfame-K Blends

| Blend Ratio Wt:Wt | Neotame (ppm) | Ace-K (ppm) | Observed Sweetness Intensity | Predicted Isobole Expected Sweetness | Predicted Additive Expected Sweetness |
| --- | --- | --- | --- | --- | --- |
| 1:294 | 0.90 | 266.73 | 5.68 | 5.26 | 6 |
| 1:294 | 1.40 | 415.38 | 7.71 | 6.67** | 8 |
| 1:294 | 2.07 | 614.74 | 8.81 | 7.90** | 10 |

Statistical Significance:
Statistical results are from t - tests comparing the observed sweetness intensity with the expected intensity
** 5% significance level A comparison of the observed sweetness intensity values to the isobole expected sweetness values in Table 2 shows that the blends of N-[N-(3,3-dimethylbutyl)-L-α-aspartyl]-L-phenylalanine 1-methyl ester with acesulfame-K displayed isobole synergy at blend ratios ranging from 1:14 to 1:294.

EXAMPLE 7

Preparation of N-[N-(3,3-dimethylbutyl)-L-α-aspartyl]-L-phenylalanine 1-methyl ester/aspartame Synergistic Blends (1:13 weight ratio)

Five different aqueous solutions of neotame/aspartame blends were prepared. Each solution had a blend weight ratio of 1:13, but different sweetness concentration levels as noted in Table 3.

The sweetness intensities of each of the five solutions were measured as previously described and the results of these measurements are set forth in Table 3.

EXAMPLE 8

Preparation of N-[N-(3,3-dimethylbutyl)-L-α-aspartyl]-L-phenylalanine 1-methyl ester/aspartame Synergistic Blends (1:57 weight ratio)

Five blends of N-[N-(3,3-dimethylbutyl)-L-α-aspartyl]-L-phenylalanine 1-methyl ester and acesulfame-K were prepared as described in Example 7, except that in each of these blends the ratio of N-[N(3,3-dimethylbutyl)-L-α-aspartyl]-L-phenylalanine 1-methyl ester to aspartame was 1:57.

The sweetness intensities of each of the five solutions were measured as previously described and the results of these measurements are set forth in Table 3.

EXAMPLE 9

Preparation of N-[N-(3,3-dimethylbutyl)-L-α-aspartyl]-L-phenylalanine 1-methyl ester/aspartame Synergistic Blends (1:294 weight ratio)

Five blends of N-[N-(3,3-dimethylbutyl)-L-α-aspartyl]-L-phenylalanine 1-methyl ester and aspartame were prepared as described in Example 7, except that in each of these blends the ratio of N-[N-(3,3-dimethylbutyl)-L-α-aspartyl]-L-phenylalanine 1-methyl ester to aspartame was 1:238.

The sweetness intensities of each of the five solutions were measured as previously described and the results of these measurements are set forth in Table 3. Table 3 also shows the predicted isobole expected sweetness and predicted additive expected sweetness values for each of the blends.

TABLE 3

Synergy of N-[N-(3,3-dimethylbutyl)-L-α-aspartyl]-
L-phenylalanine 1-methyl ester/aspartame Blends

| Blend Ratio Wt:Wt | Neotame (ppm) | Aspartame (ppm) | Observed Sweetness Intensity | Predicted Isobole Expected Sweetness | Predicted Additive Expected Sweetness |
| --- | --- | --- | --- | --- | --- |
| 1:13 | 2.41 | 32.41 | 3.52 | 3.70 | 4 |
| 1:13 | 4.04 | 54.24 | 5.78 | 5.33 | 6 |
| 1:13 | 6.05 | 81.33 | 7.77 | 6.82** | 8 |
| 1:13 | 8.58 | 115.35 | 9.29 | 8.16** | 10 |
| 1:13 | 11.8 | 158.56 | 10.26 | 9.36** | 12 |
| 1:57 | 1.42 | 80.42 | 2.98 | 3.56 | 4 |
| 1:57 | 2.29 | 129.93 | 5.38 | 5.05 | 6 |
| 1:57 | 3.31 | 187.69 | 6.38 | 6.40 | 8 |
| 1:57 | 4.51 | 255.95 | 8.13 | 7.62* | 10 |
| 1:57 | 5.95 | 337.83 | 9.07 | 8.72 | 12 |
| 1:238 | 0.58 | 136.56 | 3.58 | 3.70 | 4 |
| 1:238 | 0.95 | 225.30 | 6.08 | 5.32** | 6 |
| 1:238 | 1.40 | 332.73 | 7.78 | 6.82** | 8 |
| 1:238 | 1.96 | 454.36 | 9.33 | 8.19** | 10 |
| 1:238 | 2.64 | 627.87 | 10.20 | 9.43** | 12 |

Statistical Significance:
Statistical results are from t - tests comparing the observed sweetness intensity with the expected intensity
*10% significance level
**5% significance level A comparison of the observed sweetness intensity values to the isobole expected sweetness values in Table 3 shows that the blends of N-[N-(3,3-dimethylbutyl)-L-α-aspartyl]-L-phenylalanine 1-methyl ester with aspartame displayed isobole synergy at blend ratios ranging from 1:13 to 1:238.

EXAMPLE 10

Preparation of N-[N-(3,3-dimethylbutyl)-L-α-aspartyl]-L-phenylalanine 1-methyl ester/sucrose Synergistic Blends (1:1786 weight ratio)

Five different aqueous solutions of neotame/sucrose blends were prepared. Each solution had a blend weight ratio of 1:1786, but different sweetener concentration levels as noted in Table 4.

The sweetness intensities of each of the five solutions were measured as previously described and the results of these measurements are set forth in Table 4.

EXAMPLE 11

Preparation of N-[N-(3,3-dimethylbutyl)-L-α-aspartyl]-L-phenylalanine 1-methyl ester/sucrose Synergistic Blends (1:10,000 weight ratio)

Five blends of N-[N-(3,3-dimethylbutyl)-L-aaspartyl]-L-phenylalanine 1-methyl ester and sucrose were prepared as described in Example 10, except that in each of these blends the ratio of N-[N-(3,3-dimethylbutyl)-L-α-aspartyl]-L-phenylalanine 1-methyl ester to sucrose was 1:10,000.

The sweetness intensities of each of the five solutions were measured as previously described and the results of these measurements are set forth in Table 4.

EXAMPLE 12

Preparation of N-[N-(3,3-dimethylbutyl)-L-α-aspartyl]-L-phenylalanine 1-methyl ester/aspartame Synergistic Blends (1:33,333 weight ratio)

Five blends of N-[N-(3,3-dimethylbutyl)-L-aaspartyl]-L-phenylalanine 1-methyl ester and aspartame were prepared as described in Example 10, except that in each of these blends the ratio of N-[N-(3,3-dimethylbutyl)-L-α-aspartyl]-L-phenylalanine 1-methyl ester to sucrose was 1:33,333.

The sweetness intensities of each of the five solutions were measured as previously described and the results of these measurements are set forth in Table 4. Table 4 also shows the predicted isobole expected sweetness and predicted additive expected sweetness values for each of the blends.

TABLE 4

Synergy of N-[N-(3,3-dimethylbutyl)-L-α-aspartyl]-L-phenylalanine 1-methyl ester/sucrose Blends

| Blend Ratio Wt:Wt | Neotame (ppm) | Sucrose (% w/w) | Observed Sweetness Intensity | Predicted Isobole Expected Sweetness | Predicted Additive Expected Sweetness |
|---|---|---|---|---|---|
| 1:1786 | 1.99 | 0.356 | 2.69 | 3.09 | 4 |
| 1:1786 | 3.76 | 0.674 | 5.33 | 4.95 | 6 |
| 1:1786 | 6.05 | 1.085 | 7.89 | 6.72* | 8 |
| 1:1786 | 9.05 | 1.622 | 9.06 | 8.37 | 10 |
| 1:1786 | 12.95 | 2.322 | 10.32 | 9.84 | 12 |
| 1:10,000 | 1.28 | 1.245 | 2.37 | 3.31 | 4 |
| 1:10,000 | 2.25 | 2.182 | 5.05 | 5.02 | 6 |
| 1:10,000 | 3.3i | 3.213 | 6.50 | 6.61 | 8 |
| 1:10,000 | 4.47 | 4.338 | 8.60 | 8.07 | 10 |
| 1:10,000 | 5.72 | 5.556 | 10.12 | 9.39 | 12 |
| 1:33,333 | 0.59 | 2.244 | 2.94 | 3.63 | 4 |
| 1:33,333 | 0.99 | 3.776 | 5.36 | 5.39 | 6 |
| 1:33,333 | 1.40 | 5.340 | 7.97 | 7.06** | 8 |
| 1:33,333 | 1.82 | 6.937 | 9.72 | 8.64** | 10 |
| 1:33,333 | 2.25 | 8.564 | 10.87 | 10.13** | 12 |

Statistical Significance:
Statistical results are from t - tests comparing the observed sweetness intensity with the expected intensity
*10% significance level
**5% significance level A comparison of the observed sweetness intensity values to the isobole expected sweetness values in Table 4 shows that the blends of N-[N-(3,3-dimethylbutyl)-L-α-aspartyl]-L-phenylalanine 1-methyl ester with sucrose displayed isobole synergy at blend ratios ranging from 1:1786 to 1:33,333.

The benefits of this invention include ingredient cost savings, reduction in sweetener use, overall sweet taste and temporal profile character improvement are possible because of the knowledge of isobole synergy.

Other variations and modifications of this invention will be obvious to those skilled in the art. This invention is not limited except as set forth in the claims.

What is claimed is:

1. A sweetener blend comprising N-[N-(3,3-dimethylbutyl)-L-α-aspartyl]-L-phenylalanine 1-methyl ester and another sweetener in a combined amount effective to provide an isobole synergistic sweetening effect.

2. A sweetener blend according to claim 1, wherein said other sweetener is selected from the group consisting of saccharin, acesulfame-K, aspartame, sucrose and mixtures thereof.

3. A sweetener blend according to claim 2, wherein said other sweetener is saccharin.

4. A sweetener blend according to claim 3, wherein said N-[N-(3,3-dimethylbutyl)-L-α-aspartyl]-L-phenylalanine 1-methyl ester and said saccharin are present in a weight ratio from about 1:1.18 to about 1:517.

5. A sweetener blend according to claim 4, wherein said N-[N-(3,3-dimethylbutyl)-L-α-aspartyl]-L-phenylalanine 1-methyl ester and said saccharin are present in a weight ratio from about 1:7.5 to about 1:121.

6. A sweetener blend according to claim 3, wherein said blend provides an additive synergistic sweetening effect.

7. A sweetener blend according to claim 2, wherein said other sweetener is acesulfame-K.

8. A sweetener blend according to claim 7, wherein said N-[N-(3,3-dimethylbutyl)-L-α-aspartyl]-L-phenylalanine 1-methyl ester and said acesulfame-K are present in a weight ratio from about 1:2.48 to about 1:1497.

9. A sweetener blend according to claim 8, wherein said N-[N-(3,3-dimethylbutyl)-L-α-aspartyl]-L-phenylalanine 1-methyl ester and said acesulfame-K are present in a weight ratio from about 1:14 to about 1:294.

10. A sweetener blend according to claim 7, wherein said blend provides an additive synergistic sweetening effect.

11. A sweetener blend according to claim 2, wherein said other sweetener is aspartame.

12. A sweetener blend according to claim 11, wherein said N-[N-(3,3-dimethylbutyl)-L-α-aspartyl]-L-phenylalanine 1-methyl ester and said aspartame are present in a weight ratio from about 1:3.97 to about 1:564.

13. A sweetener blend according to claim 12, wherein said N-[N-(3,3-dimethylbutyl)-L-α-aspartyl]-L-phenylalanine 1-methyl ester and said aspartame are present in a weight ratio from about 1:13 to about 1:238.

14. A sweetener blend according to claim 2, wherein said other sweetener is sucrose.

15. A sweetener blend according to claim 14, wherein said N-[N-(3,3-dimethylbutyl)-L-α-aspartyl]-L-phenylalanine 1-methyl ester and said sucrose are present in a weight ratio from about 1:746 to about 1:94,115.

16. A sweetener blend according to claim 15, wherein said N-[N-(3,3-dimethylbutyl)-L-α-aspartyl]-L-phenylalanine 1-methyl ester and said sucrose are present in a weight ratio from about 1:1786 to about 1:33,333.

17. An aqueous solution comprising N-[N-(3,3-dimethylbutyl)-L-α-aspartyl]-L-phenylalanine 1-methyl ester, another sweetener and water, wherein N-[N-(3,3-dimethylbutyl)-L-α-aspartyl]-L-phenylalanine 1-methyl ester and said another sweetener are present in an amount effective to provide isobole synergistic sweetening of said solution.

18. An aqueous solution according to claim 17, wherein said other sweetener is selected from the group consisting of saccharin, acesulfame-K, aspartame, sucrose and mixtures thereof.

19. An aqueous solution according to claim 18, wherein said other sweetener is saccharin.

20. An aqueous solution according to claim 19, wherein said N-[N-(3,3-dimethylbutyl)-L-α-aspartyl]-L-phenylalanine 1-methyl ester and said saccharin are present in a weight ratio from about 1:1.18 to about 1:517.

21. An aqueous solution according to claim 20, wherein said N-[N-(3,3-dimethylbutyl)-L-α-aspartyl]-L-phenylalanine 1-methyl ester and said saccharin are present in a weight ratio from about 1:7.5 to about 1:121.

22. An aqueous solution according to claim 19, wherein said N-[N-(3,3-dimethylbutyl)-L-α-aspartyl]-L-phenylalanine 1-methyl ester and saccharin are present in an amount effective to provide additive synergistic sweetening of said solution.

23. An aqueous solution according to claim 18, wherein said other sweetener is acesulfame-K.

24. An aqueous solution according to claim 23, wherein said N-[N-(3,3-dimethylbutyl)-L-α-aspartyl]-L-phenylalanine 1-methyl ester and said acesulfame-K are present in a weight ratio from about 1:2.48 to about 1:1497.

25. An aqueous solution according to claim 24, wherein said N-[N-(3,3-dimethylbutyl)-L-α-aspartyl]-L- phenylalanine 1-methyl ester and said acesulfame-K are present in a weight ratio from about 1:14 to about 1:294.

26. An aqueous solution according to claim 23, wherein said N-[N-(3,3-dimethylbutyl)-L-α-aspartyl]-L-phenylalanine 1-methyl ester and acesulfame-K are present in an amount effective to provide additive synergistic sweetening of said solution.

27. An aqueous solution according to claim 18, wherein said other sweetener is aspartame.

28. An aqueous solution according to claim 27, wherein said N-[N-(3,3-dimethylbutyl)-L-α-aspartyl]-L-phenylalanine 1-methyl ester and said aspartame are present in a weight ratio from about 1:3.97 to about 1:564.

29. An aqueous solution according to claim 28, wherein said N-[N-(3,3-dimethylbutyl)-L-α-aspartyl]-L-phenylalanine 1-methyl ester and said aspartame are present in a weight ratio from about 1:13 to about 1:238.

30. An aqueous solution according to claim 18, wherein said other sweetener is sucrose.

31. An aqueous solution according to claim 30, wherein said N-[N-(3,3-dimethylbutyl)-L-α-aspartyl]-L-phenylalanine 1-methyl ester and said sucrose are present in a weight ratio from about 1:746 to about 1:94,115.

32. An aqueous solution according to claim 31, wherein said N-[N-(3,3-dimethylbutyl)-L-α-aspartyl]-L-phenylalanine 1-methyl ester and said sucrose are present in a weight ratio from about 1:1786 to about 1:33,333.

\* \* \* \* \*

UNITED STATES PATENT AND TRADEMARK OFFICE
CERTIFICATE OF CORRECTION

PATENT NO. : 6,048,999
DATED : April 11, 2000
INVENTOR(S) : Laurie L. Pajor et al.

It is certified that error appears in the above-identified patent and that said Letters Patent is hereby corrected as shown below:

COLUMN 1:
Line 12, "N-[N-" should read --¶ N-[N---; and
Line 64, "N[N-" should read --N-[N---.

COLUMN 3:
Line 8, "N[N-" should read --N- [N---;
Line 15, "acesulfameK," should read --acesulfame-K, --;
Line 21, "crystalline fructose, high conversion corn syrup," should be deleted; and
Line 25, "cal" should read --cally--.

COLUMN 4:
Line 36, "t he" should read --the--;
Line 44, "in tensity" should read --intensity--; and
Line 46, "ematic al" should read --ematical--.

COLUMN 5:
Line 57, "N-(" should read --N-[N-( --.

UNITED STATES PATENT AND TRADEMARK OFFICE
CERTIFICATE OF CORRECTION

PATENT NO. : 6,048,999
DATED : April 11, 2000
INVENTOR(S) : Laurie L. Pajor et al.

It is certified that error appears in the above-identified patent and that said Letters Patent is hereby corrected as shown below:

COLUMN 6:
Line 4, "acesulfameK" should read --acesulfame--K-- ;
Line 50, "timeintensity" should read --time-intensity--; and
Line 60, "solution" should read --solutions --.

COLUMN 7:
Line 58, "sweeteners" should read --sweetness--.

COLUMN 8:
Line 25, "N-[N(" should read --N-[N-(--.

COLUMN 10:
Line 53, "-L-aaspartyl]" should read --L– α-aspartyl]--; and
Line 66, "-L-aaspartyl]" should read ---L– α-aspartyl]--.

UNITED STATES PATENT AND TRADEMARK OFFICE
CERTIFICATE OF CORRECTION

PATENT NO.   : 6,048,999
DATED        : April 11, 2000
INVENTOR(S)  : Laurie L. Pajor et al.

It is certified that error appears in the above-identified patent and that said Letters Patent is hereby corrected as shown below:

COLUMN 11:
Line 24, "3.3i" should read --3.31--; and
Line 42, "include" should read --which include--.

Signed and Sealed this

Twelfth Day of June, 2001

*Attest:*

*Attesting Officer*

NICHOLAS P. GODICI
*Acting Director of the United States Patent and Trademark Office*